United States Patent [19]

Kurashige

[11] Patent Number: 5,155,830
[45] Date of Patent: Oct. 13, 1992

[54] DATA PROCESSING SYSTEM CAPABLE OF PERFORMING A DIRECT MEMORY ACCESS TRANSFER OF DATA STORED IN A PHYSICAL AREA IN A MEMORY

[75] Inventor: Takehiko Kurashige, Tokyo, Japan

[73] Assignee: Kabushiki Kaisha Toshiba, Kawasaki, Japan

[21] Appl. No.: 355,605

[22] Filed: May 23, 1989

[30] Foreign Application Priority Data

May 23, 1988 [JP] Japan .................. 63-125127

[51] Int. Cl.⁵ .......................................... G06F 12/06
[52] U.S. Cl. ...................... 395/425; 364/DIG. 1
[58] Field of Search ... 364/200 MS File, 900 MS File; 395/400, 425

[56] References Cited

U.S. PATENT DOCUMENTS

| | | | |
|---|---|---|---|
| 4,245,305 | 1/1981 | Gechele et al. | 364/200 |
| 4,272,819 | 6/1981 | Katsumata et al. | 395/425 |
| 4,514,808 | 4/1985 | Murayama et al. | 364/200 |
| 4,558,412 | 12/1985 | Inoshita et al. | 364/200 |
| 4,688,166 | 8/1987 | Schneider | 364/200 |
| 4,860,244 | 8/1989 | Brukert et al. | 395/250 |
| 4,881,167 | 11/1989 | Sasaki et al. | 395/425 |
| 4,942,553 | 7/1990 | Dalrymple et al. | 364/900 |

OTHER PUBLICATIONS

Handbook for Electronics, Information and Communication Engineers, vol. 2, 1988, p. 1606 (Japanese and Partial English translations).

*Primary Examiner*—Stuart S. Levy
*Assistant Examiner*—Reba I. Elmore
*Attorney, Agent, or Firm*—Finnegan, Henderson, Farabow, Garrett and Dunner

[57] ABSTRACT

A system is constituted by a DMAC, a CPU, a main memory, and an I/O device. The DMAC has a FIFO type BDW buffer for storing a buffer descriptor word (BDW) and a control unit. The control unit loads a BDW from the BDW buffer, and controls DMA. The CPU writes a new BDW in the BDW buffer during a DMA operation execution period.

11 Claims, 5 Drawing Sheets

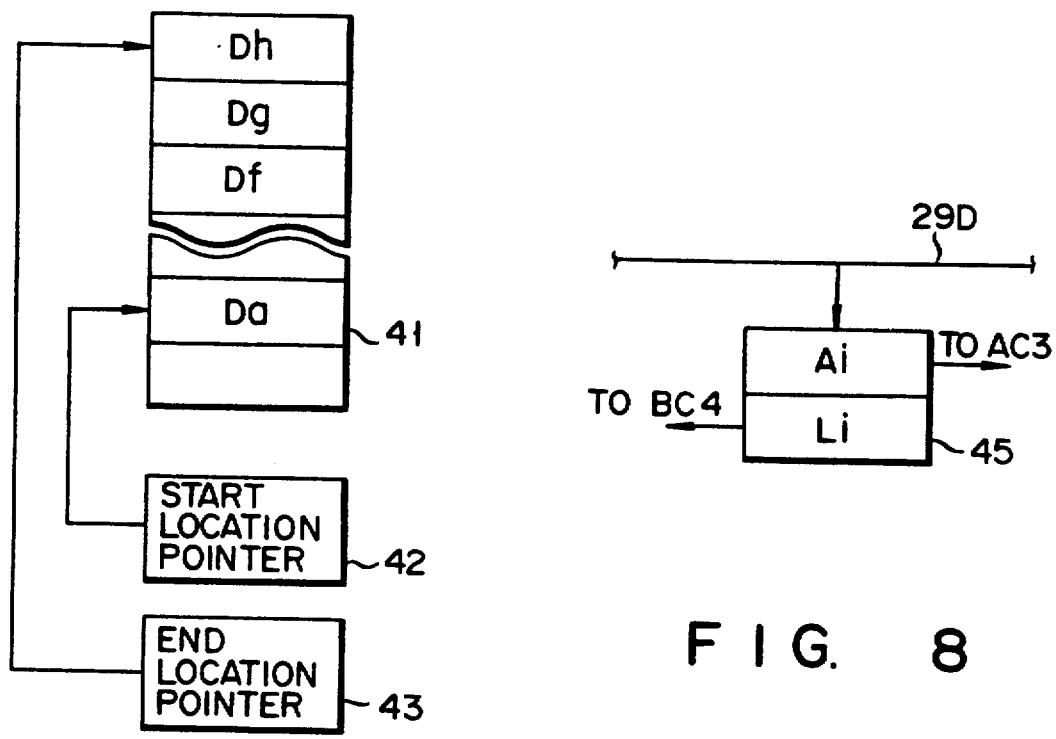
FIG. 7
FIG. 8
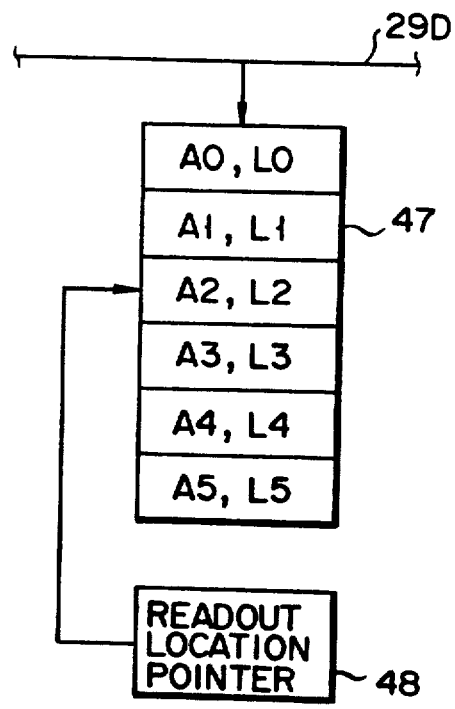
FIG. 9

DATA PROCESSING SYSTEM CAPABLE OF PERFORMING A DIRECT MEMORY ACCESS TRANSFER OF DATA STORED IN A PHYSICAL AREA IN A MEMORY

BACKGROUND OF THE INVENTION

1. Field of the Invention

The present invention relates to a data processing system having a buffer management function using a BDL (Buffer Descriptor List).

2. Description of the Related Art

One block of data of an external storage device can be written in different areas of a main memory, and can be read out from the different areas of the main memory using data chaining. This method is called a scatter read or gather write method. When data transfer is performed between a divided physical storage space and an I/O device, like in the scatter read or gather write method, the I/O device accesses memory by treating buffers scattered on the physical storage space as one continuous I/O buffer. A kind of list or table called a BDL (Buffer Descriptor List) is prepared to achieve such access.

A method of accessing memory using the BDL will be described below with reference to FIGS. 1 and 2. In FIG. 1, one block of data is divided into (n+1) sub-blocks which are stored in areas 0 to n of a physical storage space. The BDL is constituted as a list of (n+1) BDWs (Buffer Descriptor Words). Each BDWi (BDW0, BDW1, ...) corresponds to an ith storage area in the physical storage space. The BDWi consists of an address portion Ai (A0, A1, ...) indicating a start address of the ith storage area, and a length portion Li (L0, L1, ...) indicating a length (number of bytes) of the storage area.

FIG. 2 shows a conventional operation flow diagram of a CPU when DMA (Direct Memory Access) is performed using the BDL. When a CPU receives from a DMAC (Direct Memory Access Controller) a transfer end interruption signal indicating that transfer of data to a given storage area is completed, it checks if memory access is completed (step S1). If YES in step S1, control returns to a main routine. If NO in step S1, the CPU updates a pointer indicating a number of a BDW to be executed (i.e., a number of a buffer to be accessed) (step S2). The CPU sets the BDWi indicated by the pointer in the DMAC (step S3). The CPU sends a start instruction to the DMAC (step S4). Thereafter, control returns to the main routine.

In response to the start instruction from the CPU, the DMAC sequentially transfers data from the location of the start address Ai. When a total volume of transferred data coincides with a data volume represented by the length portion Li, the DMAC outputs a transfer end interruption signal to the CPU, and ends processing of the storage area. Upon reception of the transfer end interruption signal, the CPU repeats the processing shown in FIG. 2.

In the above processing, the CPU must program the DMAC in units of BDWs. More specifically, every time DMA for a given storage area is completed, the CPU must intervene in the operation of the DMAC. When an object to be accessed is a disk, this intervention time causes a rotational wait time of the disk, thus degrading system performance. When the object to be accessed is a magnetic tape, this intervention time may cause a timing error. When the object to be accessed is a line system, over-run/under-run may occur. Since overhead time is caused, operation of the entire system is delayed.

SUMMARY OF THE INVENTION

The present invention has been made in consideration of the above situation, and has as an object to provide a data processing system which can access storage areas scattered in a physical storage space in accordance with a BDL.

In order to achieve the above object, a data processing system according to the present invention comprises:

a bus for transferring data;

a main memory which is connected to the bus for storing, stores data;

an input/output device, connected to the bus, for performing data transfer by a DMA with the main memory;

a direct memory access controller, connected to the bus means for controlling the DMA, the direct memory access controller having, (i) a first-in first-out type BDW buffer (2) for storing buffer descriptor words (BDWs) including an address portion indicating a start address of each storage area scattered on a physical storage space of the main memory and a length portion indicating a size of each storage area, (ii) an address counter, connected to the bus (29), for loading the address portion of a BDW at a readout location of the BDW buffer, updating held data every time the main memory is subjected to the DMA by the input/output driver, and indicating an address of a location of the main memory to be accessed, (iii) a byte counter for loading the length portion of a BDW at the readout location of the buffer, updating held data every time the main memory is subjected to the DMA, and indicating a remaining amount of a storage area which currently serves as an object to be accessed, and (iv) a control unit for confirming an end of the DMA for the storage area which currently serves as the object to be accessed on the basis of an indication value of the byte counter, causing the address counter and the byte counter to load a new address portion and a new length portion from the BDW buffer, updating a storage area to be accessed, and controlling the DMA for a storage area indicated by the indication value of the address counter; and a local processor, connected to the BDW buffer through the bus, for, when there is an empty area in the BDW buffer, writing a new BDW.

With the above structure, the BDW can be written into the BDW buffer by a local CPU while the direct memory access controller is accessing the main memory. Consequently, the operation can be conducted quicker than the case where a BDW is set to the BDEWQ buffer after access to the main memory for the previous BDW is completed. Further, if the local CPU supplies BDWs to the BDW buffer in order, the BDWs are read out from the BDW buffer in order without a particular control. Thus the operation of the controller can be simplified.

Also with the above structure, DMA processing and BDW write processing to the BDW buffer can be executed in parallel. For this reason, overhead time, that is, time not used directly for transferring files, can be eliminated, and system performance can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention in the drawings:

FIG. 7 is a block diagram showing an arrangement of a BDW buffer 2 shown in FIG. 4; and FIGS. 8 and 9 are block diagrams showing other arrangements of the BDW buffer 2 shown in FIG. 4.

DETAILED DESCRIPTION OF THE PREFERRED EMBODIMENT

An embodiment of the present invention will be described below with reference to the accompanying drawings.

Figure 3:
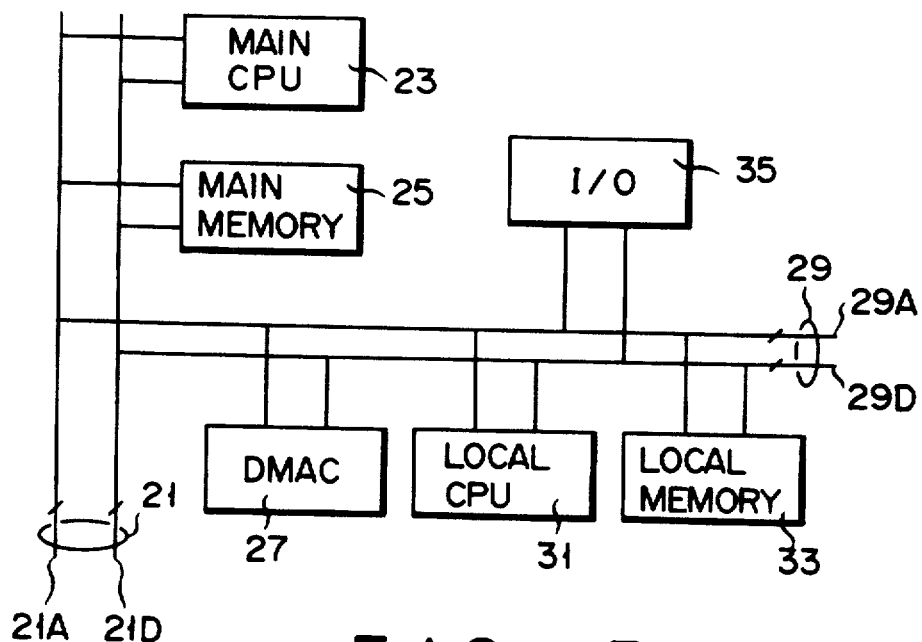
FIG. 3 is a block diagram showing an arrangement of a data processing system according to an embodiment of the present invention.

FIG. 3 shows an arrangement of a data processing system according to an embodiment of the present invention.

In FIG. 3, a system bus 21 comprises an address bus 21A and a data bus 21D. A main CPU 23 for controlling the operation of the entire system is connected to the system bus 21. A main memory 25 is connected to the system bus 21. The main memory 25 serves as a DMA (Direct Memory Access) object in this embodiment.

A local bus 29 is connected to the system bus 21. The local bus 29 comprises an address bus 29A and a data bus 29D. A DMAC (Direct Memory Access Controller) 27 is connected to the local bus 29. The DMAC 27 controls direct access of the main memory 25 without going through the main CPU 23 (DMA). Local CPU 31 controls the DMAC 27 and is connected to the local bus 29. A local memory 33 is connected to the local bus 29. The local memory 33 stores a BDL for the DMA. An I/O device 35 is connected to the local bus 29.

Figure 4:
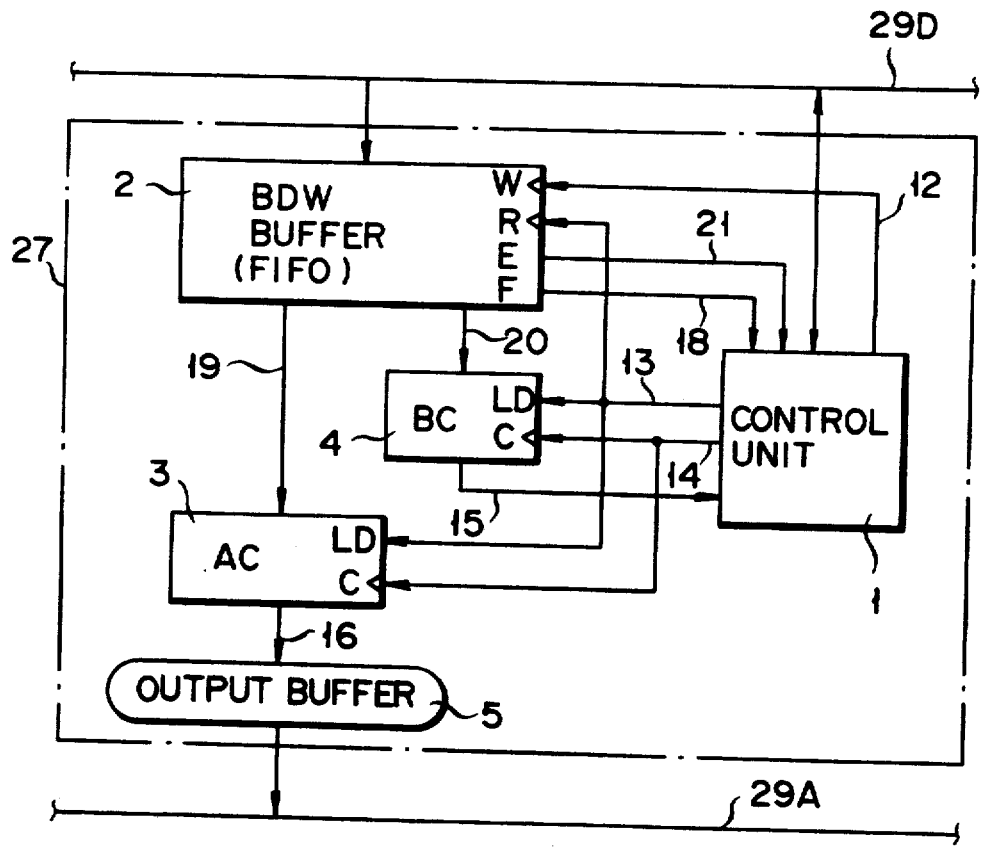
FIG. 4 is a block diagram showing an arrangement of a DMAC shown in FIG. 3.

FIG. 4 shows an internal arrangement of the DMAC 27.

As shown in FIG. 4, the DMAC 27 comprises a control unit 1, a BDW buffer 2, an address counter 3, a byte counter 4, and an output buffer 5.

The control unit 1 is connected to the data bus 29D, and exchanges data with the data bus 29D. The control unit 1 supplies a write signal 12 to a write terminal W of the BDW buffer 2. The control unit 1 supplies a signal 13 to a read terminal R of the BDW buffer 2, a load terminal LD of the byte counter 4, and a load terminal LD of the address counter 3. The signal 13 serves as a read signal for the BDW buffer 2 and also as a load signal for the counters 3 and 4. The control unit 1 supplies a clock signal 14 to clock terminals C of the address and byte counters 3 and 4. The control unit 1 receives an empty signal 21 from an E terminal of the BDW buffer 2, and a full signal 18 from an F terminal of the BDW buffer 2. The control unit 1 receives a signal 15 indicating a count value from the byte counter 4.

The BDW buffer 2 stores buffer descriptor words (BDWs). The BDW buffer 2 comprises a FIFO structure memory. The BDW buffer 2 receives a BDW from the data bus 29D. The BDW buffer 2 receives the write signal 12 at its W (Write) terminal and is set in a write mode when the write signal 12 is enabled, and receives the read signal 13 at its R (Read) terminal and is set in a read mode when the read signal 13 is enabled. When there is no held data (data which is not yet read out), the BDW buffer 2 outputs the empty signal 21 from the E terminal to the control unit 1. The BDW buffer 2 supplies a start address (address portion Ai) of each storage area scattered in the main memory 25, to the address counter 3. The BDW buffer 2 also supplies a byte length (length portion (Li)) of each of the storage areas to the byte counter 4.

The address counter 3 loads address data 19 supplied from the BDW buffer 2 in response to the load signal 13 supplied to the LD terminal of the address counter 3. The address counter 3 counts up a count value in response to the clock signal 14 supplied to its C terminal. The address counter 3 supplies the signal 16 indicating the count value to the output buffer 5. The byte counter 4 loads byte length data 20 supplied from the BDW buffer 2 in response to the load signal 13 supplied to its LD terminal. The byte counter 4 counts down a count value in response to the clock signal 14 supplied to its C terminal. The byte counter 4 supplies a count value 15 to the control unit 1. The output buffer 5 sends the signal 16 of the address counter 3 onto the address bus 29A to designate an area of the main memory 25 to be accessed.

Figure 5:
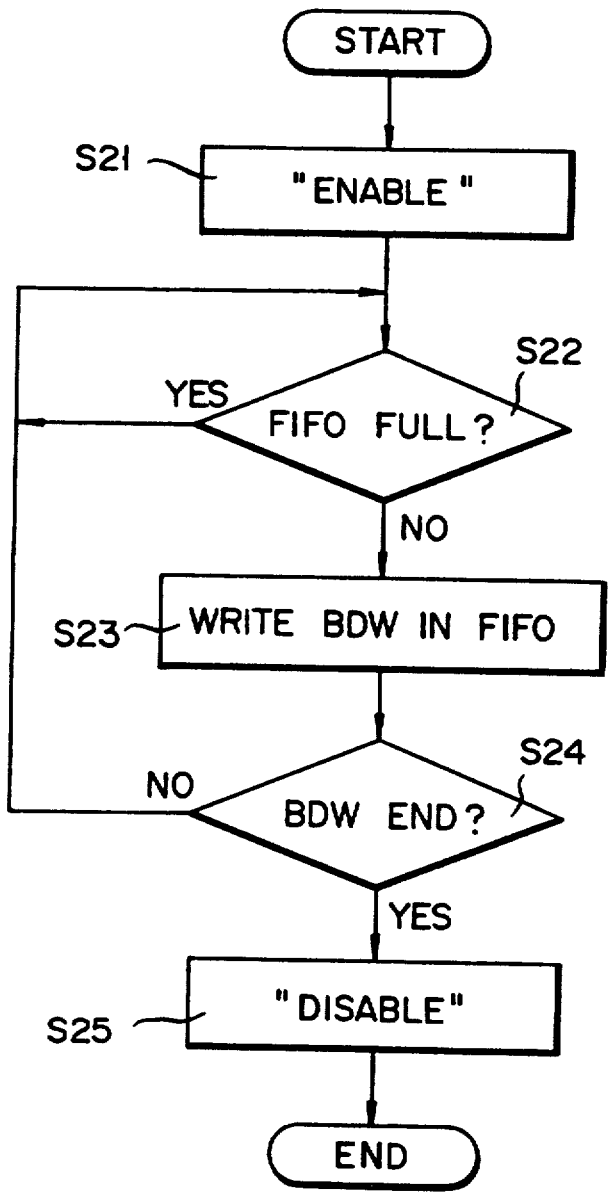
FIG. 5 is a flow chart showing an operation of a local CPU shown in FIG. 3.
Figure 6:
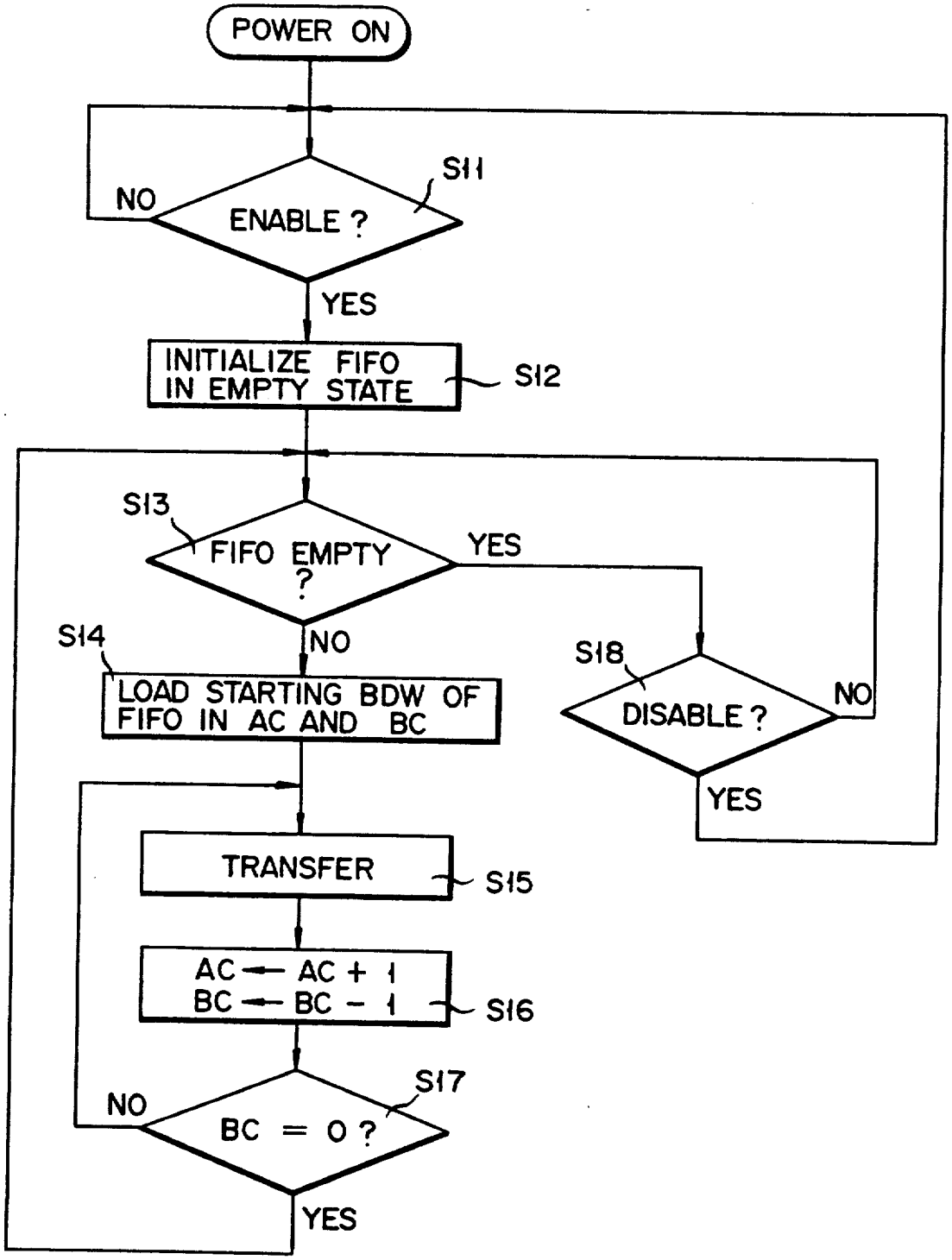
FIG. 6 is a flow chart showing an operation of the DMAC shown in FIGS. 3 and 4.

Operation of the data processing system shown in FIGS. 3 and 4 will now be described with reference to FIGS. 5 and 6.

In order to carry out DMA, the main CPU 23 specifies a start address, for example, of a virtual address to be accessed, a block length of transfer data, an address of a destination in the I/O device 35, and the like, and supplies an instruction for carrying out the DMA to the local CPU 31.

In response to the instruction from the main CPU 23, the local CPU 31 executes a DMAC control operation. This DMAC control operation will be described below with reference to FIG. 5.

The local CPU 31 enables the control unit 1 of the DMAC 27 (e.g., sets a flag indicating an enable state) (step S21). The local CPU 31 communicates with the control unit 1 to check if the BDW buffer 2 is in a full state (step S22). The control unit 1 checks the full signal 18 from the BDW buffer 2, and informs the CPU 31 whether or not the BDW buffer 2 is in the full state. If YES in step S22, i.e., if the BDW buffer 2 is in the full state, the local CPU 31 waits until the contents of the BDW buffer 2 are read out and an empty area is formed in the BDW buffer 2 (step the loop of S22). Since the BDW buffer 2 is of the FIFO type, when data is read out from the BDW buffer 2 in step S14 (to be described later), an empty region, the size of which corresponds to the amount of data read out, is generated in the BDW buffer 2. If NO in step S22, i.e., if the BDW buffer 2 is not in the full state, the local CPU 31 controls the control unit 1 to output a write signal 12. The local CPU 31 reads out a BDW from the local memory 33, and writes it in the BDW buffer 2 (step S23). The local CPU 31 checks if all the BDWs are written in the BDW buffer 2 (step S24). If it is determined in step S24 that all the BDWs are written in the BDW buffer 2, the local CPU 31 disables the control unit 1 (step S25), and ends the operation. If there are BDWs which are not written in the BDW buffer 2, control returns to step S22, and the next BDWi is written in the BDW buffer 2.

The local CPU 31 may monitor the BDW buffer 2 by poling, or may monitor it in response to an interruption signal generated by the DMAC 27.

The DMAC 27 executes DMA in response to the operation of the CPU 31. The DMA control operation will be described below with reference to FIG. 6.

Initially, e.g., upon booting up of the system, the control unit 1 is set in a disabled state. If the local CPU 31 enables the control unit 1, as shown in step S11; the control unit 1 initializes the BDW buffer 2 in an empty state (step S12). The control unit 1 checks if the BDW buffer 2 is in an empty state (step S13). If NO in step S13 (i.e., if there are non-readout BDWs in the BDW buffer 2), the control unit 1 outputs the signal 13 to the BDW buffer 2. Thus, of the BDWs held in the BDW buffer 2, a BDW which is input first is read out. The address portion of the readout BDW is supplied to the address counter 3, and its length portion is supplied to the byte counter 4 and, in response to the load signal 13, the address portion is loaded in the address counter 3, and the length portion is loaded in the byte counter 4 (step S14). An address output from the address counter 3 is output onto the address bus 29A through the output buffer 5, and designates a storage area in the main memory 25. The control unit 1 performs data transfer (DMA) between the designated storage area and the I/O device 35 (step S15). Every time of data is transferred, the control unit 1 outputs the clock signal 14. In response to the clock signal 14, the address counter 3 increments a count value by one to designate a new address, and the byte counter 4 decrements a count value by one to designate a decrease in a remaining volume of data to be transferred (step S16). In this case, transfer data comprises 8-bit data. If transfer data is 16-bit data, the count value of the address counter 3 is incremented "2" counts at a time, and the count value of the byte counter 4 is decremented by "2" at a time.

The control unit 1 checks if the count value of the byte counter 4 is "0" (step S17 i.e.,). If NO in step S17, an unaccessed area remains in a storage area which currently undergoes processing, control returns to step S15. If YES in step S17, i.e., access for the storage area which currently undergoes processing is completed, control returns to step S13 and the control unit 1 repetitively executes the above transfer processing for new BDWs.

If it is determined in step S13 that the BDW buffer 2 is "empty", control advances to step S18. The control unit 1 checks in step S18 if it is set in a disable state by the local CPU 31. If YES in step S18, i.e., all the data indicated by the BDL is already transferred, control returns to step S11. If NO in step S18, since data transfer is not completed, the control returns to step S13, and the control unit 1 waits until the local CPU 31 writes the next BDW in the BDW buffer 2.

The operations of the local CPU 31 and the DMAC 27 are executed in association with each other, and data transfer is completed between a storage area designated by the BDL of the main memory 25 and the I/O device 35. When data transfer is completed, the local CPU 31 informs the main CPU 23 by transmitting, for example, an interruption signal.

The above operation will be described in detail below. For the sake of easy understanding, a case will be examined wherein a BDL shown in FIG. 1 is given, and data is transferred from the main memory 25 to the I/O device 35 (e.g., disk device) while regarding (n+1) storage areas 0 to n scattered in the main memory 25 as one continuous buffer.

Figure 1:
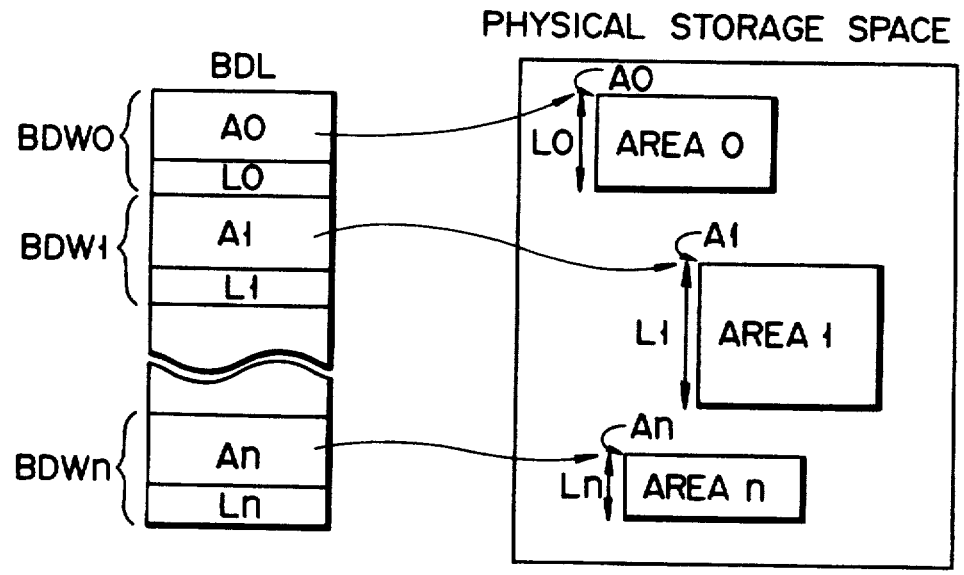
FIG. 1 is a view showing a conventional BDL, a physical storage space, and the relationship therebetween.
Figure 2:
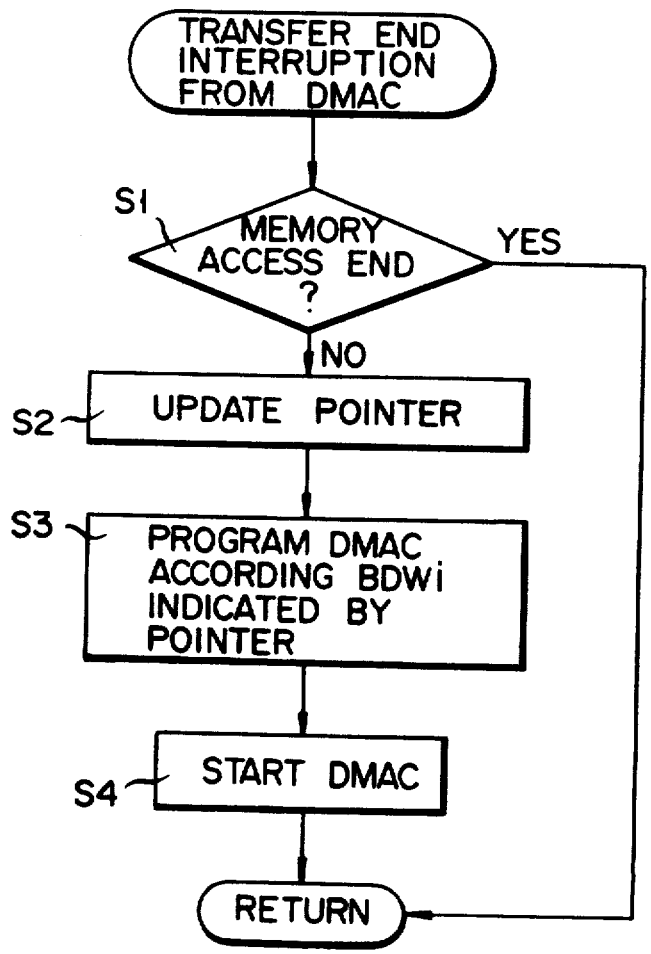
FIG. 2 is a flow chart showing a conventional processing sequence of a CPU for conventional DMA.

The local CPU 31 sequentially sets the BDWs shown in FIG. 1 in the BDW buffer 2 in accordance with an instruction from the main CPU 23 to the local CPU 31.

The control unit 1 outputs the signal 13. In response to the signal 13, the BDW buffer 2 outputs the BDWs. Since the BDW buffer 2 has a FIFO structure, the BDW which is input first is read out first (BDW0), its start address A0 is set in the address counter 3, and its byte length L0 is set in the byte counter 4. Under the control of the DMAC 27, data is transferred from the storage location of the main memory 25 indicated by the address A0 to the I/O device 35. After 1-byte of data is transferred, the control unit 1 outputs the clock signal 14 to increment the count value of the address counter 3 by one and to decrement the count value of the byte counter 4 by one. The control unit 1 transfers the data at a storage location of the main memory 25 indicated by an address (A0+1) to the I/O device 35. Thereafter, the control unit 1 sequentially transfers the data at storage locations of the main memory indicated by addresses (A0+1), (A0+2), . . . to the I/O device 35. After all the data is transferred from the storage area 0 to the I/O device 35, the count value of the byte counter 4 becomes "0". The control unit 1 detects an end of data transfer for the storage area 0. The control unit 1 outputs the signal 13, and reads out the next BDW from the BDW buffer 2. Since a BDW buffer 2 has the FIFO structure, a BDW1 is automatically read out. Thereafter, processing for a storage area 1 is performed. A similar operation is repeated, and when processing for an area n is completed, DMA is ended.

In the above embodiment, although a FIFO memory is used as the BDW buffer, the present invention is not limited to a BDW buffer having such a specific structure. For example, a FIFO memory in which stored data is moved from an input side to an output side may be employed. Alternatively, a FIFO memory which comprises a plurality of storage areas 41, a start location pointer 42, and an end location pointer 43 may be employed, as shown in FIG. 7. When data is supplied to the latter memory in a FIFO manner, the supplied data is written in a storage area next to a storage area indicated by the content of the end location pointer 43, and the content of the end location counter 43 is updated. Data is read out from a storage area indicated by the start location pointer 42, and the content of the start location pointer 42 is then updated.

In the above embodiment, data transfer upon readout of a BDW and BDW write access are performed on the BDW buffer 2 of the FIFO structure. Thus, the DMA operation and the BDW write access by the CPU can be executed in parallel. Overhead time of the CPU can be eliminated, and system performance can be improved. Since the BDW storage area adopts a FIFO structure, the system requires only a small number of hardware components, and various sizes of BDLs can be used. As long as the local CPU 31 sequentially supplies a BDWi to the BDW buffer 2, the BDWi can be sequentially read out from the BDW buffer 2 without any special control, and operation of the control unit 1 can be simplified.

As shown in FIG. 8, the BDW buffer 2 can be replaced with a memory 45 having a capacity capable of storing one BDW. The diagram of the DMAC comprising the memory 45 is the same as that shown in FIG. 4. In the arrangement of FIG. 8, the local CPU 31 sets the next BDW in the memory 45 while the control unit 1 is executing DMA. With this arrangement, the DMA operation and the BDW write access by the CPU 31 can be executed in parallel. Thus, overhead time of the CPU 31 can be eliminated, and as a result, the performance of the entire system can be improved.

The BDW buffer 2 may be constituted by a memory comprising a plurality of storage areas 47 and a pointer 48 indicating a readout location, as shown in FIG. 9. In this case, a BDW is read out from a storage area 47 indicated by the content of the pointer 48 of the memory, and thereafter, the content of the pointer 48 is updated. When the last BDW stored in the memory 47 (BDW5 in FIG. 9) is loaded in the address counter 3 and the byte counter 4, the local CPU 31 sets the next group of BDWs (BDW6 to BDW12) in the memory 47. With this arrangement, the number of times that BDWs are set in the memory 47 can be reduced, and the system can achieve higher speed of operation.

As described above, according to the present invention, data transfer upon readout of BDWs and BDW write access can be executed in parallel, so that overhead time of the CPU can be eliminated, and system performance can be improved.

The present invention is not limited to the above embodiment. For example, in the above embodiment, the system comprises the main CPU and local CPU, the main bus and local bus, the main memory and local memory, and the I/O device. However, the present invention can be applied to a system which does not have the local bus, local CPU, local memory, and I/O device. For example, in a case where the local bus 29 is used, the DMAC 27, the local CPU 31, the local memory 31, and the I/O device 35 are directly connected to the system bus 21. Even in the case where the local memory 33 is not provided, transfer of data can be performed between main memory 25 and the I/O device 35. In the case where the local CPU 31 is not provided, the main CPU 25 directly controls the DMAC 27.

As can be understood from the description associated with the drawbacks of the prior art, the present invention is particularly effective when data exchange is performed between a storage device (in many cases, a main memory) and an I/O device. However, the present invention can be applied to all cases where data which is separately stored in a plurality of storage areas is to be accessed.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A data processing system for performing a direct memory access transfer of data stored in a plurality of physical storage areas in a memory, comprising:
   bus means for transferring said data;
   direct memory access controller means, connected to said bus means, for controlling a direct memory access transfer of said data stored in one of said plurality of physical storage areas in said memory, said direct memory access controller means including:
      buffer description word (BDW) memory means, connected to said bus means, for storing at least one BDW, said at least one BDW including an address portion and a length portion indicating a start address and a length, respectively, of a respective one of said plurality of physical storage areas in said memory, and said BDW memory means having a first-in first-out structure, and
      control means, connected to said bus means and said BDW memory means, for reading a BDW stored in said BDW memory means according to said first-in first-out structure of said BDW memory means, and for performing a direct memory access transfer of data stored in said one of said plurality of physical storage areas in said memory according to the address portion and the length portion of said read BDW; and
   local CPU means, connected to said bus means, for storing a new BDW in said BDW memory means.

2. The system of claim 1, wherein said direct memory access controller further includes:
   address counter means, connected to said control means and said BDW memory means, for storing an address count value, said address count value being indicative of the address portion of the BDW read from said BDW memory means by said control means; and
   byte counter means, connected to said control means and said BDW memory means, for storing a byte count value, said byte count value being indicative of the length portion of the BDW read from said BDW memory means by said control means,
   wherein said control means updates said address count value and said byte count value upon completion of a direct memory access transfer by incrementing said address count value and decrementing said byte count value.

3. The system of claim 1, wherein said local CPU means and said direct memory access controller means operate in parallel.

4. The system of claim 1, wherein said BDW memory means includes means for generating an empty signal indicating the existence of an empty storage area in said BDW memory means, and wherein said local CPU reads a new BDW from a local memory and stores said new BDW in said BDW memory means upon a detection of said empty signal.

5. The system of claim 2, wherein said local CPU means includes means for enabling and disabling said control means, and said control means includes means for clearing contents of said BDW memory means after said control means has been enabled by said local CPU means, and wherein said local CPU means reads a new BDW from a local memory and stores said new BDW in said BDW memory means after said contents of said BDW memory means have been cleared by said control means, and said local CPU means disables said control means after a selected number of new BDWs have been stored in said BDW memory means and said byte count value is zero.

6. A direct memory access controller for performing a direct memory access transfer of data stored in a plurality of physical storage areas in a memory, the data being transferred through a bus, comprising:

coupling means for coupling said direct memory access controller to the bus;

buffer description word (BDW) memory means, connected to said coupling means, for storing at least one BDW, said at least one BDW including an address portion and a length portion indicating a start address and a length, respectively, of a respective one of said plurality of physical storage areas in the memory, and said BDW memory means having a first-in first-out structure; and control means, connected to said coupling means and said BDW memory means, for reading a BDW stored in said BDW memory means according to said first-in first-out structure of said BDW memory means, and for performing a direct memory access transfer of data stored in one of said plurality of physical storage areas in the memory according to the address portion and the length portion of said read BDW.

7. The direct memory access controller of claim 6, further comprising:

address counter means, connected to said control means and said BDW memory means, for storing an address count value, said address count value being indicative of the address portion of the BDW read from said BDW memory means by said control means; and byte counter means, connected to said control means and said BDW memory means, for storing a byte count value, said byte count value being indicative of the length portion of the BDW read from said BDW memory means, wherein said control means updates said address count value and said byte count value upon completion of a direct memory access transfer by incrementing said address count value and decrementing said byte count value.

8. The direct memory access controller of claim 6, wherein said BDW memory means includes means for generating an empty signal indicating the existence of an empty storage area in said BDW memory means.

9. In a data processing system having a memory, a method for performing a direct memory access transfer of data stored in a plurality of physical storage areas in the memory, the method comprising the steps of:

storing at least one BDW in a BDW memory, said BDW memory having a first-in first-out structure, and said at least one BDW including an address portion and a length portion indicating a start address and a length, respectively, of a respective one of said plurality of physical storage areas in the memory;

reading out a BDW from said BDW memory according to the first-in first-out structure of the BDW memory;

performing a direct memory access transfer of data stored in one of said plurality of physical storage areas in the memory according to the address portion and the length portion of the read BDW; and storing a new BDW in the BDW memory.

10. The method of claim 9, wherein the step of performing a direct memory access transfer and the step of storing a new BDW in the BDW memory are performed concurrently.

11. The method of claim 9, further including the step of:

generating an empty signal indicating the existence of an empty storage area in the BDW memory, wherein the step of storing a new BDW in the BDW memory is performed upon a detection of the empty signal.

* * * * *

UNITED STATES PATENT AND TRADEMARK OFFICE
CERTIFICATE OF CORRECTION

PATENT NO. : 5,155,830
DATED : October 13, 1992
INVENTOR(S) : Takehiko Kurashige It is certified that error appears in the above-identified patent and that said Letters Patent is hereby corrected as shown below:

Claim 1, column 8, line 7, change ":" to --;--.

Claim 7, column 10, line 2, change "means."
to --means,--.

Signed and Sealed this

Sixteenth Day of November, 1993

*Attest:*

BRUCE LEHMAN

*Attesting Officer*    Commissioner of Patents and Trademarks